May 27, 1941.　　　A. J. DIESCHER　　　2,243,333
APPARATUS FOR FORMING OR COATING SHEETS AND THE LIKE
Filed July 26, 1937　　　8 Sheets-Sheet 1

Fig. 1.

INVENTOR
Alfred J. Diescher
BY
ATTORNEY

May 27, 1941.　　A. J. DIESCHER　　2,243,333
APPARATUS FOR FORMING OR COATING SHEETS AND THE LIKE
Filed July 26, 1937　　8 Sheets-Sheet 3

INVENTOR
Alfred J. Diescher.
BY
ATTORNEY

May 27, 1941.  A. J. DIESCHER  2,243,333
APPARATUS FOR FORMING OR COATING SHEETS AND THE LIKE
Filed July 26, 1937  8 Sheets-Sheet 6

INVENTOR
Alfred J Diescher.
BY
ATTORNEY

May 27, 1941.   A. J. DIESCHER   2,243,333
APPARATUS FOR FORMING OR COATING SHEETS AND THE LIKE
Filed July 26, 1937   8 Sheets-Sheet 8

INVENTOR
Alfred J. Diescher
BY
ATTORNEY

Patented May 27, 1941

2,243,333

UNITED STATES PATENT OFFICE 2,243,333

APPARATUS FOR FORMING OR COATING SHEETS AND THE LIKE

Alfred J. Diescher, Winfield, Kans.

Application July 26, 1937, Serial No. 155,669

15 Claims. (Cl. 91—30)

This invention relates to an apparatus for forming plastic sheets of viscous materials or applying a liquid or viscous coating, pigmented or not pigmented, upon various surfaces as in coating for protective or artistic purposes cellulose, paper, fabrics, leathers, decalcomanias, compositions and similar substances.

It is the present practice in applying various coatings such as those containing cellulose esters, cellulose ethers, or resinous coatings of various types not containing cellulose materials, to coat sheets by passing them over a roller covered with the solution or coating material by spraying. It is well known that these methods offer many difficulties which have limited the commercial practicability of such coatings although they are particularly desirable in protection of catalog covers, art pieces and magazines, packages and sacks containing perishable merchandise, moist goods and the like, and have many uses where articles are ordinarily overlaid with sheets of cellulose, Celluloid or similar coverings. These difficulties include speed of coating, excess quantities of coating materials used, loss of volatile solvents during the coating process, cumbersomeness in handling the coated sheets, limitation of coating materials to low viscosity solutions, and exposure of the coating to atmosphere while on the applicating rolls, which not only causes evaporation of its lighter volatile constituents, but in certain types of solutions absorption of moisture from the air affects the protective value and finish of the coating. When higher viscosity coatings are applied in accordance with the first mentioned method, striations or ribbing, streaking and other defects result in the finished product. In some instances it is desirable to apply more than one coat to a given surface, such as a finish coat over a priming coat of adhesive character. It is difficult to apply the finish coat with present coating appliances for the reason that the primer or adhesive coating does not dry sufficiently within coating time to prevent sticking, rolling up, or marring of the surface of the primer when entering or passing through the coating machine.

Another disadvantage with present coating methods is that the machines must be set to give a fixed thickness of coating on a sheet, leaving a free space between the surface of the machine and the surface to be coated, usually of approximately the thickness of the coat to be applied. Generally this free space is ample so that the sheet can be freely moved or shifted about by hand. In such case there is no material pressure applied in placing the material on the area to be coated, which results in an inferior coated product.

It is, therefore, the principal object of the present invention to provide an apparatus for applying coatings in such a manner as to overcome the above mentioned defects, that is, to apply the coating at lower cost, to apply coatings of higher viscosity even up to 5,000 poises, thereby widening the field of chemical solutions or liquids for coating purposes, to provide greater speed of coating as well as better application of the coating, to provide satisfactory placement of thinner coatings of viscous materials on the surface to be coated, and to prevent atmospheric contact with the coating solution until after the coating has been applied.

Other important objects of the invention are to apply viscous coatings under pressure so as to effect better adherence, to flatten the sheet or form, and to lay down and bridge the fibers and other irregularities; to provide variable pressure on the work being coated based upon the characteristics of the coating solution and the nature of the sheet being used; and to provide, if desired, for application of additional coatings of the same or different solution on a highly adhesive primer without marring the prior coat.

Other objects of the invention are to provide the coating solution in the volume as required with preferably a surplus volume circulating across the area to be coated so as to prevent coagulation, sedimentation or solidification from any cause existing under the coating procedure.

It is also an object of the invention, if desired, to warm or heat the coating between the interval when it emerges from the coating applicator and prior to its admission to a drier.

In accomplishing these and other objects of the invention, as hereinafter pointed out, I have provided improved details of structure, the preferred forms of which are illustrated in the accompanying drawings, wherein.

Referring more in detail to the drawings:

1 designates a coating apparatus constructed in accordance with the present invention and which includes a sheet feeding section 2, a coating section 3 and a drier section 4. In the illustrated instance, the feeding section 2 is carried by the frame of the coating section 3, which includes side members 5 and 6 connected at their respective ends by suitable cross bars 7 and 8 to provide a rigid structure. Projecting upwardly from the side members, at a point adjacent the bar 8 and spaced from the bar 7, are extensions 9 and 10 for supporting the coating applicating mechanism generally designated 11.

Figure 1:
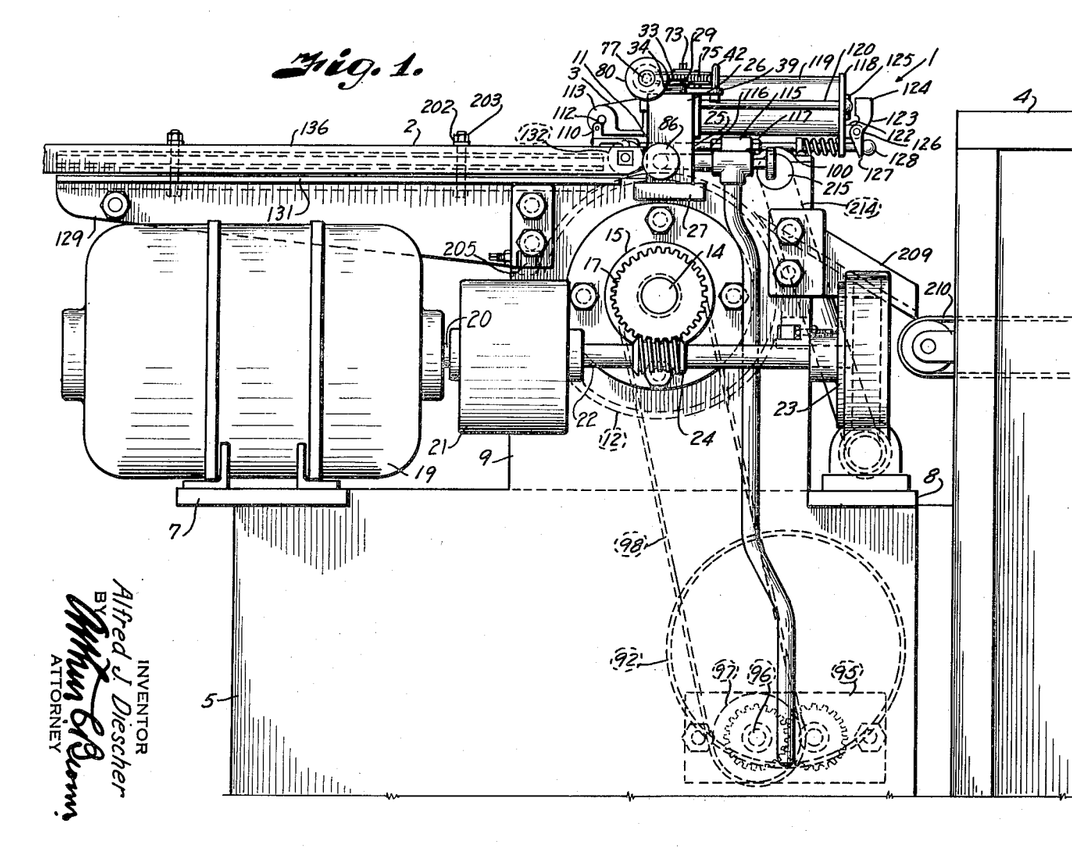
Fig. 1 is a side elevational view of a coating apparatus embodying the features of the present invention.
Figure 2:
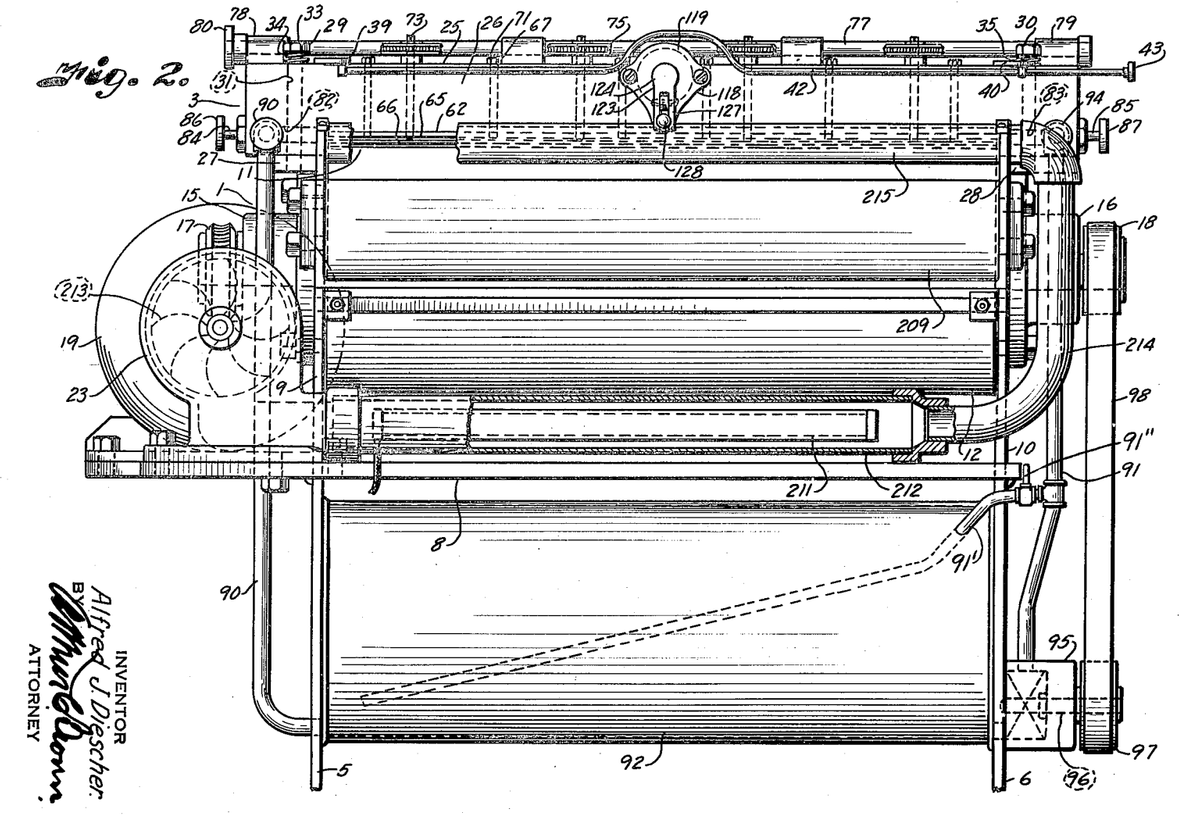
Fig. 2 is an end view of the coating section of the apparatus, parts of which are in section to better illustrate their construction.
Figure 6:
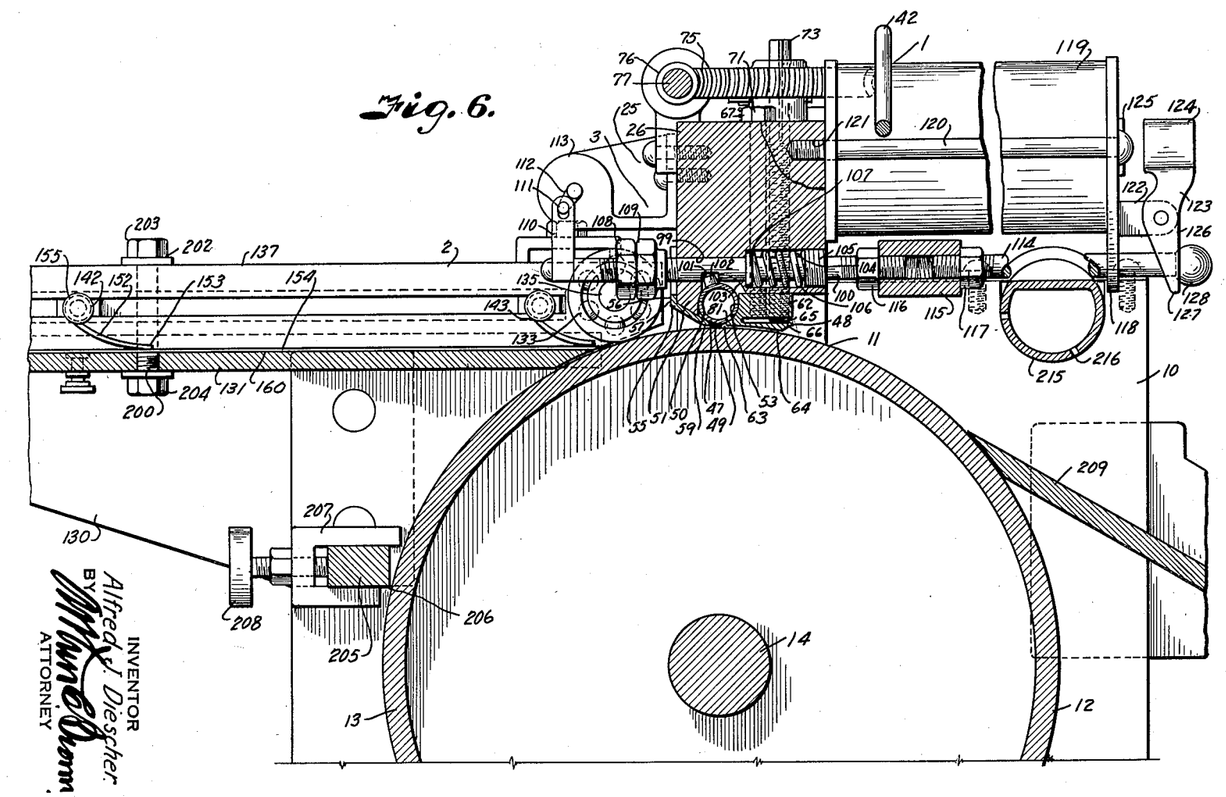
Fig. 6 is a longitudinal central section through the coating section of the machine.
Figure 7:
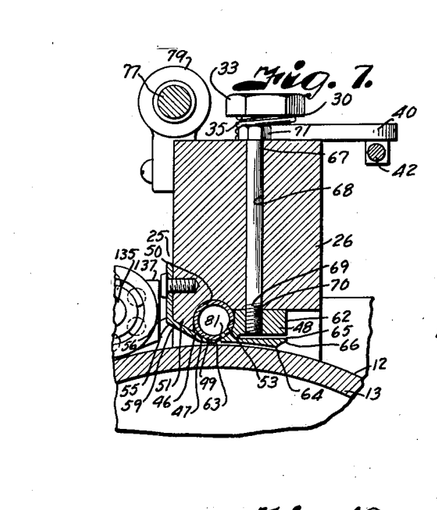
Fig. 7 is a detail section through the coating applicator and its supporting bar.

In the form of the invention illustrated in Figs. 1 to 11 inclusive, the coating mechanism includes a platen roller 12, preferably in the form of a hollow, cylindrical drum, with the ends and cylindrical wall 13 being of sufficient rigidity to resist pressure applied thereon incidental to formation of the coating. The surface of the cylinder is preferably dulled to engage frictionally the sheets of material that are fed thereacross as later described. The cylinder is supported between the side extensions 9 and 10 on a shaft 14 having its ends rotatably journaled in suitable bearings 15 and 16 carried on the outer sides of the frame extensions as best illustrated in Figs. 1 and 2. The ends of the shaft project from the bearings to mount respectively a worm gear 17 and a driving pulley 18. The platen roller thus described is continuously operated by means of a prime mover, such as a motor 19, that is mounted upon the cross member 7 having its armature shaft 20 connected by means of a speed variator 21 with a driven shaft 22, extending along the outer face of the frame extension 9, in alignment with the worm gear 17 and which has its opposite end rotatably journaled in a blower housing 23, later described. Fixed on the shaft 22 is a worm 24 meshing with the worm gear 17 to drive the platen roller in a clockwise direction (Fig. 1). The platen roller carries the sheet material to be coated under a superimposed coating applicator 25 which includes a bar 26 extending transversely across the machine parallel with the axis of the roller, with its ends supported upon angle members 27 and 28 carried by the side extensions 9 and 10 so that the vertical median line of the bar is offset laterally from the vertical plane extending through the axis of the platen roller, as best shown in Fig. 6.

Figure 9:
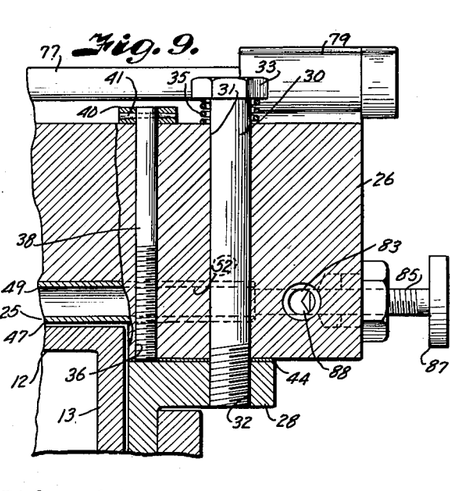
Fig. 9 is a detail section through one end of the applicator supporting bar.

The bar is yieldingly retained in seated position upon the angle memberss by means of bolts 29 and 30, having sliding fit in vertical openings 31 at the respective ends of the bar and threaded into openings 32 formed in the angle members 27 and 28, the bolts being of sufficient length that the heads 33 thereof are spaced from the upper surfaces of the bar to accommodate coil springs 34 and 35 that are sleeved over the shanks of their respective bolts and have their ends bearing against the heads 33 and the upper surfaces of the bar, as clearly shown in Fig. 9. The bar is thus adapted for movement to and from the periphery of the platen roller and from the angle members upon compression of the springs 34 and 35. This is an important feature in the present invention in case it becomes necessary to raise the bar should a sheet of material tend to block the entry between the bar and platen roller, as later described.

In order to raise the bar selectively the ends thereof are provided with threaded openings 36 extending parallel with the openings 31, and threaded therein are jam-screws 37 and 38 having their lower ends bearing against the angle members 27 and 28 and their upper ends projecting from the upper surface of the bar to accommodate crank arms 39 and 40 that are fixed thereto by pins or the like 41 (Fig. 9). The free ends of the crank arms project laterally beyond the side of the bar and are pivotally connected with an actuating bar 42. One end of the bar 42 projects beyond the side of the machine and carries a knob 43 whereby the bar may be readily reciprocated to actuate the crank arms and effect rotation of the jam-screws in the proper direction to raise the bar from the angle members 27 and 28. Raising of the bar is also important to permit ready insertion of shims 44 between the ends of the bar and the upper surfaces of the angle members, as best shown in Fig. 9, the thickness of the shims corresponding to the thickness of the material being coated so as to locate the bar in desired spaced relation with the surface of the platen roller. In practice, the shims may consist of strips of the material being coated which are inserted as shown in Fig. 9. The bar 26 is of substantially rectangular cross-section and has sufficient body so that it is not readily affected by changes of temperature tending to bring about misalignment of the bar.

In carrying out the present invention, the coating solution is supplied in the volume required, and preferably with a surplus volume circulating across the point of application. Excessive volume is particularly desirable in a solution the nature of which requires stirring or movement to prevent its coagulation, sedimentation or solidification from any cause existing under the coating procedure, or if it is desirable to constantly supply fresh solution at the point of application. It is also essential that application of the coating be controlled so that the coating may be applied to selective portions of a continuous sheet, or to intermittent sheets that are individually run through the machine as later described. I therefore provide the applicator bar with valve means for selectively controlling and timing application of the coating material responsive to movement of the material being coated, as now to be described.

Figure 10:
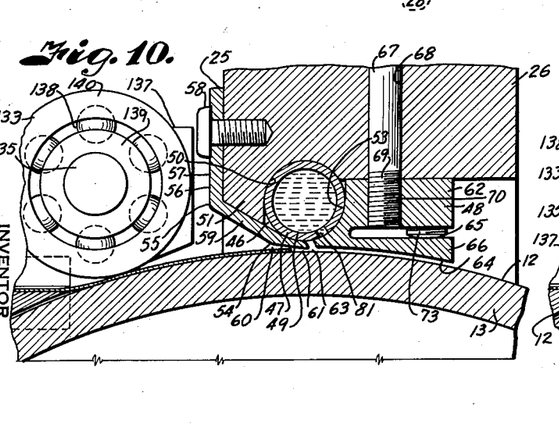
Fig. 10 is an enlarged detail section through the applicator mechanism showing the applicator valve prior to opening and a sheet of material being moved into coating position.

Formed in the lower face of the bar, and extending across the width of the platen roller, is a recess 46 to accommodate a valve member 47 and an applicator apron or bar 48 as best shown in Fig. 10. The valve 47 is shown as consisting of a cylindrical tube 49, seated in an arcuate groove 50 that is formed in the upper wall of the recess and in a depending lip 51 at the entry of the side of the bar. The arcuate groove 50 conforms to the diameter of the valve tube and has its axis located substantially in a vertical plane extending through the axis of the platen roller and spaced from the surface thereof. The ends of the tube are journaled in suitable sockets 52 that are formed in the ends of the bar as shown in dotted lines in Fig. 9, and have their axes aligning with the axis of the tube so that the tube may rotate substantially freely against the arcuate groove 50 and against arcuate portions 53 formed on the forward edge of the apron 48, and in the edge 54 of an entry apron 55 which cooperates with the groove 50 to form a substantially cylindrical housing for the valve as shown in Fig. 10.

Figure 11:
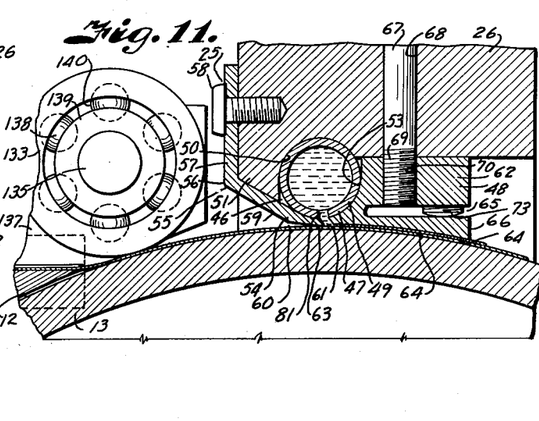
Fig. 11 is a similar section showing the valve opened and the coating being applied to the sheet.

The entry apron includes an angular plate 56 having a flange 57 secured to the applicator bar by cap screws 58, and an angularly extending flange 59 projecting under the lip 51 toward the periphery of the platen roller to form an entry throat 60 converging toward a passage 61 that is provided between the surface of the platen roller and the edge 54 underlying the valve tube. The passage 61 is of slightly greater height at its entry end than the thickness of the material being coated, and tapers toward its exit end so that the height thereof is substantially equivalent to the thickness of the material and terminates substantially in the vertical plane extending through the axis of the platen roller and valve tube respectively. The apron 48 includes a bar 62 which conforms in length to the recess 46 and is shaped to provide the arcuate portion 53 underlying the valve tube and cooperating with the edge 54 of the apron plate 55 in forming a slotted port 63 sloping toward the exit side or the direction of sheet travel and through which the coating material is exuded onto the material to be coated as later described. The under face 64 of the apron is highly polished or plated with particularly hard, smooth material and in effect conforms in curvature to the dulled surface of the platen roller and provides a coating face for smoothing the coating material on the work piece being coated. As shown in Fig. 11, the coating face is offset upwardly from the slot edge of the entry face to provide a mold space for the coating material.

Attention is directed to the fact that the shape of the coating face of the applicator is important and varies with different types of materials coated, for example, whether the sheets are rigid or flexible. In any case, the space between the entry lip and coated surface should be kept to a minimum to prevent back flow of solution under pressure and to permit a film of solution on the entry face when handling sheets that have been previously coated with a tacky material.

The shape and relative spacing of the apron face 64 to the surface of the platen is also important to prevent ribbing or striation of the coating. With stiff sheet material the face of the apron can be almost a plane, while with flexible sheets the form of the apron follows the arc of the platen, the essential point being that the sheet should not form an angle of departure with the coating face of the apron. Should the line of departure diverge, that is the sheet move away from the coating surface, "stringing" occurs due to the fact that the upper surface of the coating tends to adhere to the coating face of the apron and the lower surface to the sheet being coated. Continued movement of the sheet causes the stringing to split, with the result that the strings form striations or ribbing. This is avoided in the present machine by forming the surface on the apron so that the sheet is kept moving substantially in the continuous plane of the coating surface. Even should there be a tendency for the coating to string, the stringing lies flat on the sheet and the direction of pull is parallel therewith so that the strings become flattened out and pressed against the sheet.

To adjust the thickness of the applied coat, the bar 48 is provided with a longitudinal slot 65 extending from the side thereof opposite the valve tube and located adjacent the lower edge of the bar to provide a flexible lip 66 extending across the width of the platen roller, and which is adapted to be moved to and from the periphery of the platen roller to vary the height of the exit end of the passageway or mold space that is formed between the arcuate under surface thereof and the surface of the platen roller.

Figure 8:
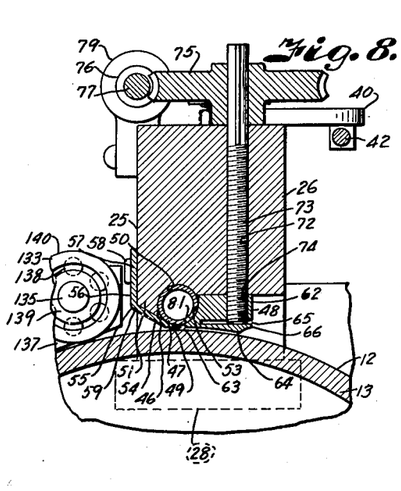
Fig. 8 is a similar section taken through one of the adjusting screws for effecting thickness of the film applied.

The apron 48 is rigidly anchored against the top of the recess 46 by cap screws 67 extending through vertical openings 68 spaced along the length of the applicator bar and having threaded ends 69 engaging in threaded openings 70 that are provided in the apron bar, as best shown in Fig. 10. The screws 67 are provided with heads 71 which engage the upper surface of the applicator bar to draw the apron bar in rigid engagement with the top of the recess 46. In order to provide means for adjusting the lip 66, the applicator bar is provided with a series of spaced threaded openings 72, carrying threaded shafts 73 having their lower ends projecting through aligning openings 74 in the apron bar and engaging against the lip as shown in Fig. 8.

Figures 3, 4, 5:
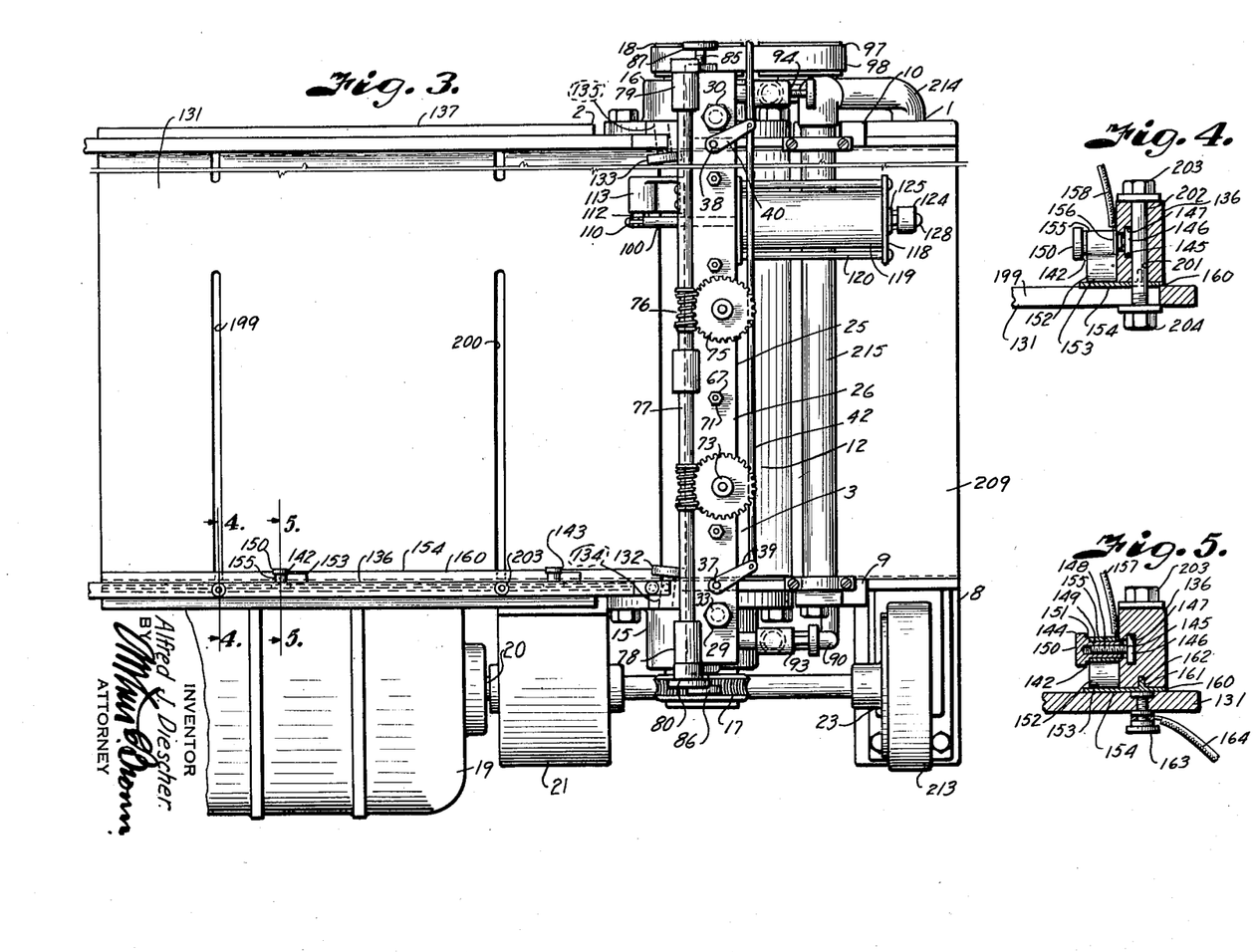
Fig. 3 is a plan view of the coating section.
Fig. 4 is a detail section on the line 4—4 of Fig. 3.
Fig. 5 is a section on the line 5—5 of Fig. 3.

Slidably keyed to the upper projecting ends of the screws are worm gears 75, meshing with worms 76, fixed to a counter-shaft 77 having its ends journaled in suitable bearings 78 and 79 that are carried on the ends of the applicator bar, as best shown in Fig. 3. The end of the shaft adjacent the bearing 78 carries a wheel 80 having a micrometer scale to indicate the amount of adjustment of the lip upon manipulation of the wheel, when raising or lowering the lip to vary the thickness of the coating material, as hereinafter described.

Formed in the wall of the valve tube, and substantially conforming to the width of the port 63, is an outlet slot 81, through which coating material is discharged from the interior of the tube when the slot registers with the port 63. The ends of the valve tube communicate with valving chambers 82 and 83, wherethrough the flow of liquid is selectively suspended by valving members 84 and 85 that are manipulated by suitable hand wheels 86 and 87, carried at the respective ends of the applicator bar, so that the valving members may be moved to and from the ends of the tube and across ports 88 that are provided in the ends of the bar and which are respectively connected with discharge and supply pipes 90 and 91, leading to and from a coating containing tank 92 that is carried between the side members 5 and 6. Located in the pipes 90 and 91, at the points where they communicate with the ports leading to the valving chambers 82 and 83, are needle valves 93 and 94 respectively, for controlling pressure of coating material in the applicator valve. The pipe 91 connects with the discharge of a pump 95, which has its inlet connected with the tank 92 and is supported on the side frame 6. The operating shaft 96 of the pump is provided with a pulley 97 that aligns with the pulley 18, previously described, and is driven by a belt 98 operating over the respective pulleys. It is thus obvious that upon rotation of the platen roller the pulley 18 drives the pump through the belt 98 to draw coating material, under pressure, through the pipe 91 into the valving chamber, and through the valve tube to the opposite end thereof to the valving chamber 82 for return to the tank through the pipe 90. When the coating material is throttled by the valve 93 or 94, the excess volume discharged by the pump is by-passed back to the inlet end of the tank through a branch pipe 91' under control of a pop valve 91''. Circulation is thus maintained of surplus coating material that is moved through the valve tube, particularly when the valve is in position for closing the port 63. In usual practice the slots or ports 63 and 81 would be somewhat shorter than the exact width of the coated area to counteract or balance the side spread of the solution. In case narrower sheets are to be coated means may be provided for closing off portions of the ports 63 to the width desired to be coated. The valve movement is also adjustable so as to open or close only a desired portion of the slot 81 in accordance with the rate that the coating solution is needed to accomplish the desired coating thickness and uniformity, as now to be described.

Extending transversely through the applicator bar, at a point above the valve tube, is a guide opening 99 for slidably mounting an actuating rod 100, having a notch 101 therein to receive a pin 102 that projects radially from the upper portion of the valve tube, as best illustrated in Fig. 6, the pin 102 being adapted to move in an arcuate groove 103 that is formed in the bottom of the arcuate groove 50, at a point aligning with the guide opening 99. The forward end of the rod 100 extends through a counterbore 104, and is guidingly supported in a plug 105 that is threaded into the open end of the bore to compress a coil spring 106 that has been sleeved over the rod and has one end bearing against the plug and its other end against a collar 107 that is fixed to the rod. The spring thus normally holds the rod in valve closing position, that is, the slot 81 is normally retained out of registry with the port 63 as shown in Fig. 10. The opposite end of the rod projects from the rear face of the bar and carries jam-nuts 108 and 109 that are threadedly mounted on the projecting end thereof to engage against the face of the bar and stop movement of the rod when the slot 81 has moved into opening relation with the port 63. By adjusting the jam-nuts the movement of the rod may be stopped in any desired position to adjust the effective opening between the slot 81 and port 63 to thereby control the amount of coating material that is exuded therethrough onto the sheet being coated.

The jam-nut end of the rod carries an arm 110, having a pin and slot connection 111 with an actuating arm 112 of a counter 113 to record the number of sheets that move through the machine, the valve being opened and closed once for each of the sheets. By thus recording the movements of the valve an accurate check can be kept on the number of sheets coated. The other end of the actuating rod is adjustably connected with an extension 114, by a turnbuckle 115, that is retained in adjusted position by means of jam-nuts 116 and 117, threaded on the respective rods and engaging the ends of the turnbuckle as shown in Fig. 6. The forward end of the extension 114 is slidably mounted on a bracket 118 carried by a solenoid magnet 119. The solenoid magnet 119 is secured to the applicator bar by bolts 120 extending through the bracket 118 and into threaded sockets 121 of the applicator bar to clamp the magnet therebetween.

Projecting from the bracket 118 is a lug 122 to which is pivotally mounted an armature 123, having a head 124 formed of suitable material to be attracted by the core 125 of the magnet when the magnet is energized, as later described, to effect rocking movement of the armature. The opposite arm 126 of the armature terminates in a yoke 127 straddling the rod extension and engaging a ball-shaped head 128 thereof. When the head of the armature is drawn toward the magnet the yoke engages the ball 128 to reciprocate the actuating rod against action of the spring to effect opening of the valve.

Carried by the respective extensions 9 and 10 of the side frames are rearwardly extending arms 129 and 130, carrying a feed table 131 on which sheets of material are delivered to the platen roller. Entry into the machine of a sheet or area carrying a primer or adhesive coat encourages raising of the entering edge from the normal plane of the sheet, and to prevent an adhesive sheet face from contacting the entry face of the bar the sheet is fed into the entry throat at an angle to the apron face so that only the front edge touches the entry face and so proceeds in the clearance space or passage 61 until the edge of the sheet passes the port 63. When the solution feed commences through the port 63 under sufficient pressure, the edge of the sheet is forced away from the entry face, and the coating solution is injected to a distance back of the port on the entry face until pressure effect and forward movement of the sheet effect balance, holding the adhesive coated face away from the entry apron. The apron is thus lubricated with the coating solution so as to avoid sticking, marring or injuring of the prime coated sheet. In order to accomplish this result the table 131 is set at a lower level than the horizontal tangency point of the platen roller, as shown in Fig. 6, so that when a continuous strip, or sheets, is fed across the table the free edge thereof will ride upwardly upon the periphery of the platen roller, and the edge will be directed against the inclined portion of the entry apron to be guided theredown into the passage 61, as shown in Fig. 10.

In order to further guide the sheet, I may provide a roller cooperating with the platen roller to feed the sheets therebetween. However, when feeding sheets with a primer coat, it is necessary that the feed roller should contact only the marginal edges of the sheet to avoid marring of the primer coat. The feed table is, therefore, provided with rollers 132 and 133 that are mounted on spindles 134 and 135 that are carried at the ends of guide rails 136 and 137, mounted on the sides of the table as shown in Figs. 3 and 6. The rollers may be of the antifriction type and include ball bearings 138, operable in races 139 and 140, the outer race forming the periphery of the roller. The side rails are preferably formed of non-metallic material and are of insulating character to mount a series of brush contacts 141, 142 and 143 on one of the rails, for example the rail 136. The contacts are best illustrated in Fig. 5 and are carried by terminals 144 adjustably movable along the guide rail. The terminals 144 include headed screws 145, having rectangular shaped heads 146 slidable in an undercut groove 147 that is formed in the inner face of the bar. The shanks 148 of the screws project from the groove, and threaded thereon are terminal sleeves 149 having heads 150 of larger diameter than the sleeves to form clamping shoulders 151. The contacts comprise flexible brushes 152 having foot portions 153 adapted to engage a stationary contact strip 154 and having barrel portions 155 mounted on the sleeves 149.

Also engaging the sleeves are washer-like terminals 156 for connecting conductors 157, 158 and 159 with the respective brush contacts. When the terminal sleeves are tightened on the shanks 148, the shoulders 151 cooperate with the inner face of the guide rail to clamp the barrel portion of the brush contact against the washer-like terminals 156 to establish electrical connection between the respective conductors and the brush contacts. The contact 154 includes a strip of conductive material 160, which is clamped between the guide rail and the table, as shown in Fig. 5, the strip being of a width to project beyond the inner face of the rail in contacting relation with the brush contacts. The strip also includes a lip portion 161 that is slidable in a groove 162, formed in the bottom of the rail, to prevent lateral movement of the strip relative to the rail and to permit sliding adjustment of the strip in a longitudinal direction. Fixed to the strip is a terminal 163 that is connected with a conductor 164 leading to one of the terminals 165 of a double pole switch 166.

Figure 12:
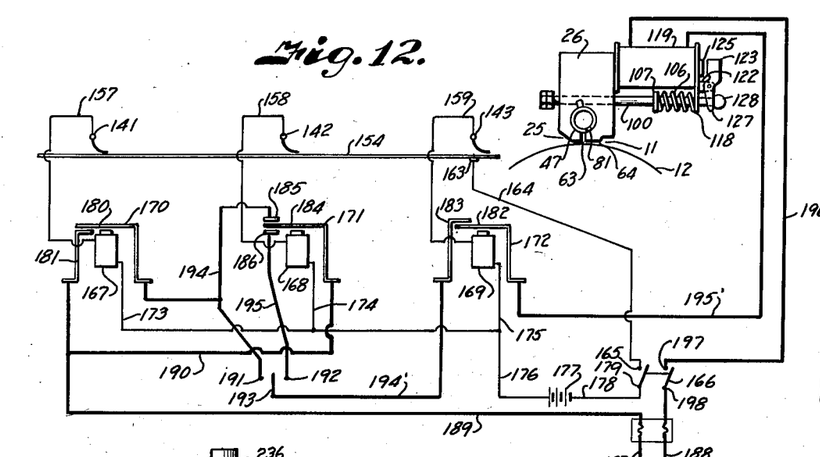
Fig. 12 is a wiring diagram particularly illustrating the controls for timing actuation of the applicator valve.

The conductors 157, 158 and 159 are respectively connected with solenoids 167, 168 and 169 of electro-magnet switches 170, 171 and 172. The other ends of the magnet windings are connected by conductors 173, 174 and 175 with a common conductor 176 leading to one of the terminals of a battery 177. The other terminal of the battery is connected by means of a conductor 178 with a terminal 179, complementary to the terminal 165 of the switch 166 so that when the switch is closed and the brush contacts are engaged with the stationary contact strip all of the solenoid windings are energized for the respective magnetic switches. The switch 170 includes an armature 180 that is adapted to engage a fixed contact 181 when the solenoid 167 is energized. The switch 172 includes a similar armature 182, and a stationary contact 183 that is broken when the solenoid 169 is energized. The switch 171 includes a movable armature 184 that normally makes contact with a stationary contact 185 and with a spaced contact 186 when the solenoid 168 is energized.

A current sufficient to operate the magnet 119 is supplied from service lines 187 and 188, the service line 187 being connected by a conductor 189 with the stationary contact 181 of the switch 170, and with the armature 184 of the switch 171 by a branch conductor 190 leading from the conductor 189. The stationary contacts 185 and 186 of the switch 171 are connected with switch contacts 191 and 192 of a switch 193 by conductors 194 and 195. The arm of the switch 193 is connected by a conductor 194' with the fixed contact 183 of the switch 172, and the armature 182 thereof is connected by a conductor 195' with one of the leads of the magnet 119. The other lead of the magnet 119 is connected by a conductor 196 with the other open contact 197 of the switch 166, the complementary terminal of which is connected by a conductor 198 with the other service line 188 to complete the electrical circuit.

The guide rails 136 and 137 are adjustably mounted on the table according to the width of the material being coated, the table being provided with transverse slots 199 and 200 aligning with openings 201 in the rails, and through which clamping bolts 202 are extended to clamp the rails in adjusted position, as best shown in Fig. 4, the heads 203 of the bolts engaging the top of the rails and the nuts 204 clampingly engaging against the bottom of the table.

If, for any reason, coating material should contact the periphery of the platen roller, I provide means for cleaning the surface thereof, including a doctor bar 205 having a scraper portion 206 contacting the surface of the platen. The bar is slidably mounted in guides 207 that are carried by the inner faces of the side members 5 and 6. The bar is adjusted toward the platen by means of adjusting screws 208 that are threaded through the guides and have their ends bearing against the adjacent ends of the doctor bar. The coated sheets of material, after passing the applicator bar, are delivered to a chute 209 leading to a conveyor belt 210 for carrying the coated sheets through the drying section 4 of the apparatus.

In some instances, particularly when using the thermoplastic coatings, it may be desirable to warm the material at the point of feed. It is also desirable to maintain a warm zone on the outlet side of the machine and up to the point of the drier, as many coatings absorb moisture from the atmosphere, marring their gloss (known as "blushing"), especially when solvent evaporation is rapid and temperature reductions occur on the feed therefrom, reducing the moisture carrying power of the contacting atmosphere. To overcome this difficulty, and to heat the applicator bar at the point of feed, I have provided a heater 211 that is supported in a tubular casing 212 for heating air that is moved through the casing by a blower 213, so that heated air is discharged from the opposite end of the casing into a duct 214 leading to an exhaust manifold 215 extending across the width of the applicator at a point intermediate the coating applying apparatus and the drier. The manifold 215 includes a pipe having a plurality of perforations 216 through which heated air is discharged in the direction of the coating applicator and against the coated work-pieces as they are discharged down the chute 209.

Figure 13:
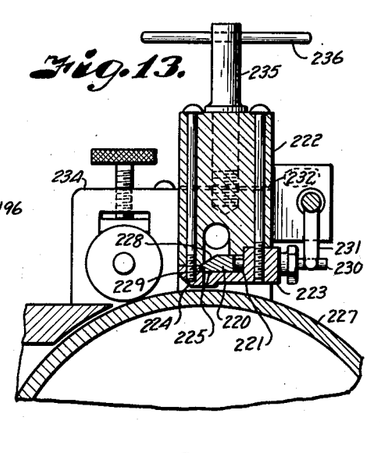
Fig. 13 is a section through a modified form of applicator.
Figure 14:
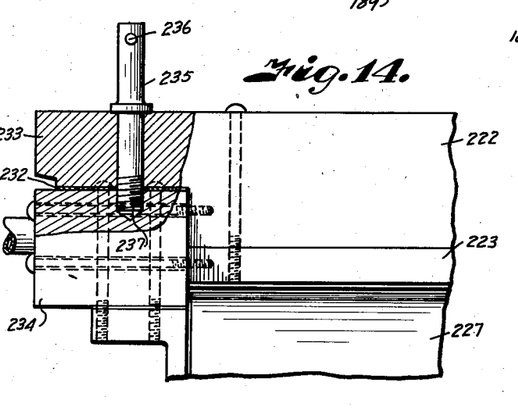
Fig. 14 is a detail view of one end of the applicator supporting bar illustrated in the form of the invention shown in Fig. 13.
Figure 15:
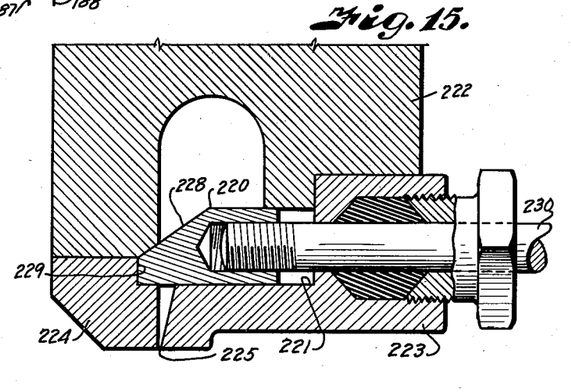
Fig. 15 is an enlarged detail section through the valve portion of the applicator shown in Fig. 13.

Figs. 13 to 15 inclusive show the flow of coating material controlled by a slide valve 220 slidable in a recess 221 that is formed in the applicator supporting bar 222 and the applicator bar 223. The bar 223 cooperates with a bar 224 to form the slot 225, through which the material is exuded onto the work as it is moved across the surface of the platen roller 227. The upper face of the slide valve is preferably bevelled, as indicated at 228, and is receivable in a groove 229 formed between the bars 224 and 222. The slide valve is provided with actuating rods 230 that are slidable in openings of the bar 223 and are actuated by rocker arms 231 to reciprocate the valve to and from closed position. The proper spacing between the bar 224 and the surface of the platen roller is adjusted according to the thickness of the material moved through the machine, by inserting a thickness of the material 232 between the ends 233 of the bar 222 and the side of the supporting frame 234. The ends of the bar are retained in fixed position by screws 235 having cross bars 236 whereby the screws are rotated to thread them into sockets 237 in the blocks of the side frame 234.

Figure 16:
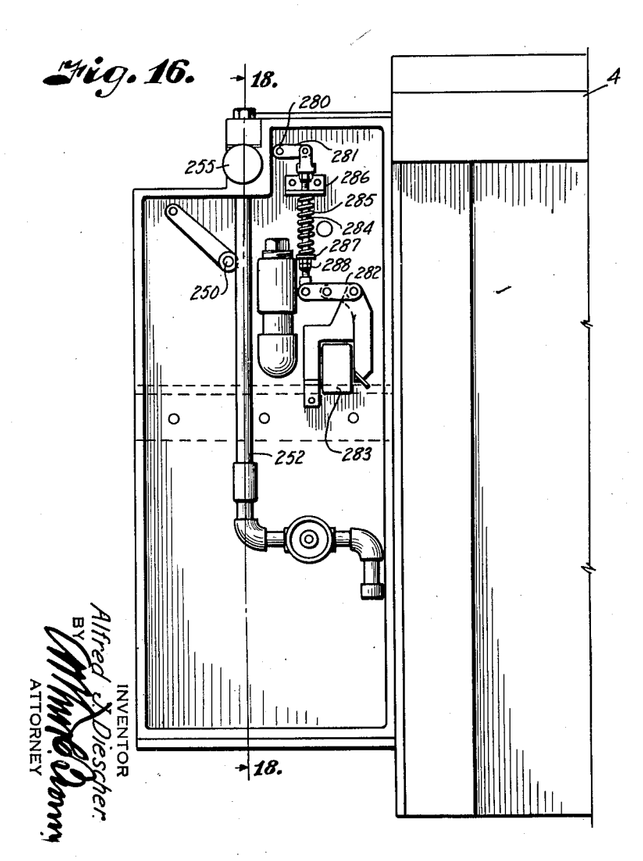
Fig. 16 is a side elevational view of a modified form of the invention.
Figure 17:
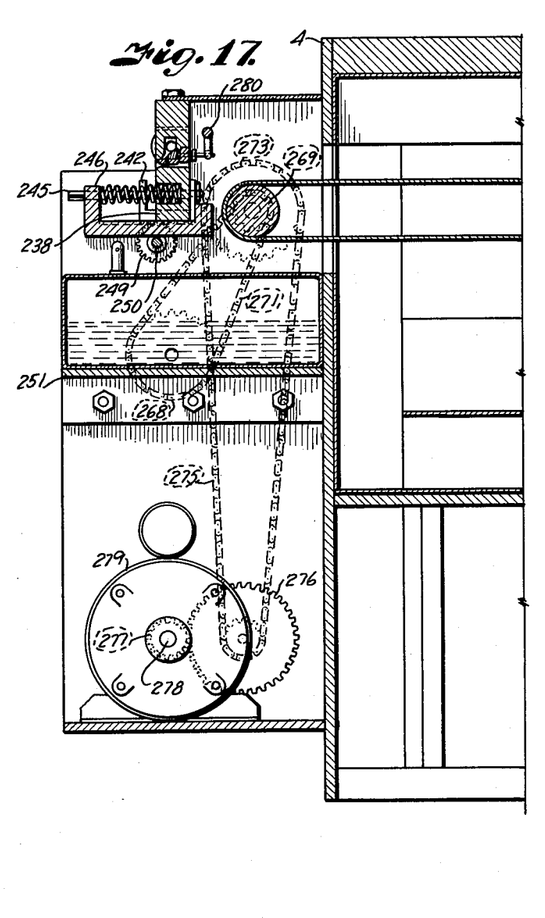
Fig. 17 is a vertical section through the machine illustrated in Fig. 16.
Figure 18:
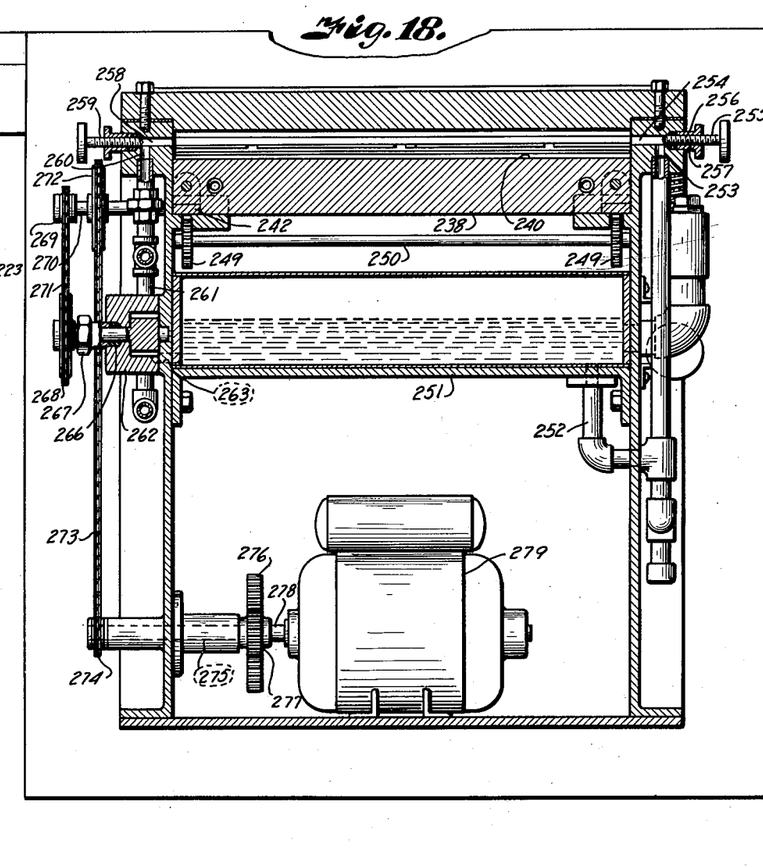
Fig. 18 is a cross-section on the line 18—18 of Fig. 16.
Figure 19:
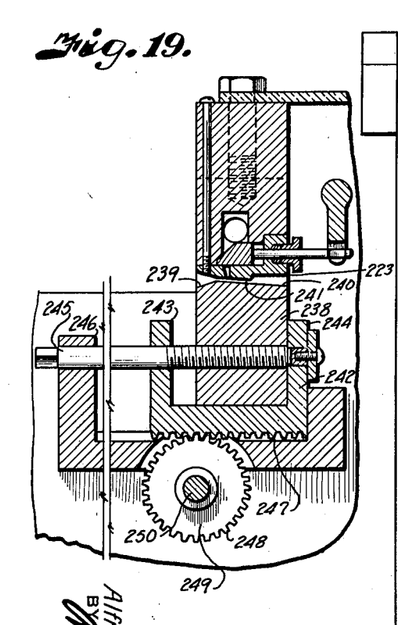
Fig. 19 is an enlarged section through the applicator parts of the machine illustrated in Figs. 16 to 18 inclusive.

The applicator mechanism illustrated in Figs. 16 to 18 inclusive is similar to that illustrated in Figs. 13 to 15, but the platen includes a bar 238 having an inclined face 239 sloping upwardly toward the applicator bar to terminate slightly in advance of the slot 225 in a downwardly sloping face 240 cooperating with the coating face 241 on the bar 238. In order to further adjust spacing between the platen bar 238 and the applicator, the platen is mounted in yoke-shaped racks 242 between upstanding flanges 243 and 244. Rotatable in the flanges, and extending through threaded openings in the bar, are adjusting screws 245, the outer ends of which are rotatably mounted in upwardly extending lugs 246 on the frame of the machine. The outer ends of the bar are provided with polygonal shaped heads to permit the application of a suitable wrench or the like to effect movement of the bar 238. In order to facilitate movement of the bar 238 away from the applicator, for instance when a paper should tend to jam between the respective bars, the rack-like yoke member is provided with teeth 247 meshing with the teeth 248 on pinions 249, the pinions being carried on a shaft 250 extending across the width of the machine and having its ends journaled in the side frames thereof. In this form of the invention the coating container is carried on a cross bar 251, having its ends secured to the side frame as best shown in Fig. 18. The bottom of the tank is connected by a conduit 252 with an inlet port 253 leading to a port 254 communicating with a channel in the applicator bar. The effective area of the port 254 is controlled by a needle valve 255, having a stem 256 adjustably mounted in a stuffing box 257. The opposite frame is provided with a valved port 258 controlled by a similar needle valve 259 to regulate flow through a lateral port 260 leading to the discharge connection 261 of a pump 262. The pump 262 is preferably of the gear type and has its inlet connection 263 connected with the tank whereby material is circulated from the tank through the channel formed by the applicator bar, the pressure and rate of flow of the liquid being adjusted by the valves 255 and 259. The pump has its operating shaft 266 extending through a stuffing box 267 and provided with a sprocket 268 that is driven from the sprocket 269 on a countershaft 270 by a chain 271 operating over the respective sprockets. The shaft 270 is actuated by a sprocket 272 that is driven by a chain 273 operating over a sprocket 274 on a countershaft 275 having a pinion 276 meshing with a gear 277 on the shaft 278 of a motor 279.

In Figs. 16 and 17 the arms 281 depend from a rock shaft 280 that carries a crank 281, which is connected with a bell crank lever 282 of a magnet 283, the bell crank 282 being connected with the arm 281 by a rod 284. The valve is normally retained in closed position by means of a coil spring 285 sleeved on the rod and having one end bearing against a guide bracket 286, and its other end against a washer 287 that is sleeved on the rod and engages against adjusting nuts 288 threaded on the rod.

In operating the machine hereinbefore described, the sheets to be coated are successively delivered onto the feed table 131 so that one edge thereof engages under the brushes 141, 142 and 143, the sides of the sheet being guided by the rails 136 and 137 which have been previously adjusted according to the width of the sheets. The sheet is moved along the table until the forward edge thereof engages the platen roller 12 and the side edges engage under the rollers 132 and 133 which cooperate with the platen roller to effect spread and feed of the sheet under the applicator mechanism. Continued movement of the sheet causes the forward edge thereof to engage the entry apron 55 which guides the edge of the sheet downwardly in the entry throat 60 into the passage 61. Up to this point the valve 47 is closing the slotted port 63.

In case of intermittent sheets, the switch arm 193 is moved to engage the contact 192 so that the relays 171 and 172 are effective when circuit is made or broken through the brushes 142 and 143. The brush 142 is adjusted so that when the forward margin of the sheet has just entered under the slot 63, the brush 142 just makes contact with the conductor strip 154 and the brush 143 is set a sufficient distance from the slot 63 so that the coating entrained in the slot during closing of the valve is sufficient to spread over the rear edge of the sheet before it leaves the coating applicator. Since an uncoated margin is permissible on both ends of the sheet, these adjustments are not critical. The applicator bar is then adjusted for thickness of the sheet by inserting strips of the sheet material 44 between the ends of the bar and the angle members 27 and 28 as shown in Fig. 9. If desired this adjustment may be effected by wedges, screws or other means. These strips are readily inserted upon manipulation of the bar 42 to actuate the jam-screws 37 and 38 which raise the bar from its seated contact with the angle members 27 and 28, against action of the springs 35. After insertion of the strips, movement of the bar 42 is reversed to permit seating of the ends of the applicator bar 26 on the strips or shims 44. The coating face 64 of the lip 66 is adjusted relatively to the surface of the sheet according to the desired thickness of coating to be applied thereon. This adjustment is readily effected through rotation of the shaft 77 and worm and worm gears 76 and 75 to operate the threaded shafts 73. The ends of the shafts 73 bearing against the lip, move the coating surface toward the surface of the sheet so that the space therebetween regulates the thickness of the coating material. The valves 93 and 94 are adjusted to regulate pressure of the coating material circulated through the applicator valve 47. When the pump is operated coating material is circulated from the tank 92 through the pipe 91 under control of the valve 94 and through the interior of the applicator valve for return through the pipe 90 under control of the valve 93.

Now, assuming that the switch 166 has been closed to render the timing circuits effective, and the motor 19 is operating to drive the platen roller, pump 95, and the blower 23, the platen roller continues feed of the sheet under the applicator mechanism. As soon as the rear edge of the sheet clears the brush 142, a circuit is established from the battery 177, through the conductors 176, 174, magnet 168, conductor 158, brush 142, contact strip 154 and conductor 164, completing the circuit through the battery. The magnet 168 is, therefore, energized to close circuit through the switch 171. Upon closing of the switch 171, a circuit is established through the valve magnet by way of the conductors 189, 190, armature 184, contact 186, switch 193, contact 183, armature 182, conductor 195, magnet winding 119 and conductor 196, to the line wire 188. The magnet winding 119 is, therefore, effective in energizing the solenoid core 125 to effect actuation of the armature 123, to operate the rod 100 against action of the spring 106. Movement of the rod 100 oscillates the applicator valve to bring the slot 81 therein into registry with the port 63. A portion of coating solution then circulating through the valve is exuded through the slot and impinges against the moving sheet, to be carried under the coating face 64 of the lip 66. Pressure is effected on the lip by means of the adjusting screw shafts 73 to effect desired pressure in the film space between the face of the sheet and coating face 64. The coating face is of sufficient width to prevent undue flooding or passing of the coating from under the bar in excess amount, especially on the entry side of the port 63. The natural tendency under well adjusted spacing, speed, and pressure, is for the coating to move forward with the sheet travel, thereby reducing tendency of the coating material to work under the entry side of the slot. With greater degree of pressure, the tendency is for the coating to pass out under the entry side and this is an important advantage in case a second coat is to be applied on a prior coat of tacky material. Wetting of the entry side with the exuded material acts as a protection against marring of the prior coat as it avoids direct contact of the tacky coat with the entry apron. Some coatings will require greater pressure, both in mechanically transporting them through the valve to the sheet and also in pressing the coating onto the sheet for better adherence, to press down fine threads or fibre, or irregularities in the sheet structure and to control coatings of higher viscosity. In some coatings it is essential that the heater 211 be energized so that hot air is discharged against the exit side of the applicator mechanism to heat the platen roller and applicator. This is particularly desirable when operating with thermoplastic coatings. If desired, the platen roller may be directly heated by injecting a heating medium within the interior thereof and the applicator by inserting an electric element directly in the channel through which the coating material is circulated. The pressure function also has other purposes as holding the sheet closely to the roller to assure uniform film thickness, to press the sheet against the platen roller to effect greater frictional contact of the sheet than frictional resistance offered by the coated surface moving against the highly polished coating face 64.

Attention is directed to the fact that in general practice the space below the coating surface is set about $1/1000$ or $2/1000$ of an inch clear of the sheet face. This allows for thickness of the coating desired, and also for slight variation in the sheet thickness. For example, most papers vary in thickness even over a single small area as much as $5/10000$ of an inch. Also if a coverage of 800 square feet per gallon of coating is desired, the space between the sheet face and the coating face would need to be $2/1000$ of an inch. For various coverages the spacing would vary accordingly. One gallon operating over a surface $1/1000$ of an inch thick would cover 1600 square feet. This spacing would need to have taken in effect, generally by fit and try, absorption of coating in the sheet body, and any reductions in area of the solution passing through the coating slot. Attention is directed to the fact that since the coating surface 64 is curved to follow the radius of the platen roller, the sheet does not depart away from the lip 66. There is, therefore, little or no tendency for the coating to string as above pointed out, and even should the coating tend to string the pull is in the direction of movement of the sheet so that the strings are caused to flatten thereagainst, thereby eliminating ridges and striations that ordinarily show when heavy viscous coatings are employed.

The high volatility of most solvents used in the coating cause rapid evaporation and resultant drop in temperature which chills the surrounding air and precipitates moisture upon the wet coat. In many coating solutions there is a strong tendency for the coating to "blush," or dull by absorption of this water. This greatly reduces the value of the coating process. However, in the present instance the hot air directed on the sheet from the manifold 215 maintains substantially uniform temperature between the applicator mechanism and the entry of the sheet into the drier to prevent blushing of the coating. The application of heated air between the exit side of the applicator and the drier is, therefore, an important feature of the present invention. As soon as the rear edge of the sheet clears the brush 143, the brush 143 makes contact with the conductor strip 154 to close circuit from the battery 177, through the magnet 169 to break contact of the armature 182 with the contact 183, thereby interrupting circuit to the magnet 119 so that the spring 106 is again effective in closing the valve to shut off flow of coating material through the slot 63. There is, however, sufficient time interval for the entrained coating material in the slot to complete coating of the rear portion of the sheet.

When coating long strips of material, the switch 193 is set to close circuit through the contact 191 so that the brushes 141, 142 and 143 are all effective in controlling the relay switches 170, 171 and 172. In this instance the brush 142 becomes effective in creating uncoated transverse areas on the sheet of material as where the sheet contains multiple printing, for example, cigarette or coffee bag blanks, and where an uncoated end is desired for pasting the packages or bags together with a less costly adhesive than will be required to adhere resinous coatings. In this instance the brushes 141 and 143 control starting and stopping of the coating as to the ends of the sheet or roll, and the brush 142 interrupts coating for the transverse areas by contacting the conductor strip 154 through apertures in a side margin of the sheet. With all the brush contacts engaging the paper strip, the magnet circuit is effective to retain the valve in open position so that the coating operation would be continuous until the brush 142 contacts the conductor strip 154 through one of the perforations, then when this perforation moves from the brush 142, the current is caused to flow in the magnet 168 to again actuate the relay switch 171 for reestablishing current to the valve magnet. The brushes 141 and 143 are offset from the perforations in the sheet so that the perforations will not affect the currents controlled thereby. The brush 141 is to nullify action of the brush 142 when the end of the sheet passes out from under the brush 141, thus the sheet can pass forward from under brush 142 without interruption until it passes from under brush 143 when the relay switch 172 functions and cuts out current to the valve magnet. Attention is directed to the fact that electrical eyes or other mechanism could be adopted in place of the illustrated control.

The form of the invention illustrated in Figs. 13 and 14 operates in exactly the same manner as that disclosed in the first described form of the invention.

The form illustrated in Figs. 16 to 19 may be operated in the same manner, however, the sheet must be continuous, or suitable feeding means provided for moving the sheet or sheets over the fixed platen.

From the foregoing it is obvious that I have provided an apparatus particularly adapted for forming plastic sheets of viscous materials, or applying a viscous coating upon various surfaces.

In extensive demonstrations with my invention coating solutions ranging from below ten poises to above five thousand poises have been successfully applied as against maximum viscosities of two to nine poises under present commercial practice, also to coverages per gallon solution up to 4,000 square feet against 800 to 2,000 square feet as present normal practices; this at atmospheric temperatures ranging from 40° to over 90° as against the 65 to 75° temperature range of present practice.

What I claim and desire to secure by Letters Patent is:

1. In a machine of the character described, a platen member, an applicating member, means for effecting movement of a sheet between said members, means for supplying a viscous coating material to the applicator, pressure means for supplementing head pressure of the coating material to hold said sheet in contact with the platen member, means for exerting a yielding pressure upon the applicator member in the direction of the platen, and stop means for limiting yielding pressure of the applicator in the direction of the platen to maintain a definite spacing between the applicating and platen members.

2. In a machine for coating sheets, a platen roller for movably supporting a sheet to be coated, a coating applicator having a coating face substantially corresponding in curvature to and spaced from the platen roller and having a port through which a coating material is exuded, a valve controlling said port, means for supplying a coating material through said applicator, and means for maintaining the coating material under sufficient pressure to fill said space and hold said sheet in contact with the platen roller.

3. In a machine for coating sheets, a platen roller for movably supporting a sheet to be coated, a coating applicator having a coating face corresponding in curvature to and spaced from the platen roller and having a port through which a coating material is exuded, a valve controlling said port, a closed conducting circuit for circulating a coating material through said applicator, including means for supplying said coating material through said port and under the coating face under sufficient pressure to fill said space and hold the sheet against said platen roller while the sheet is being carried under said coating face, and means for heating said coating material including said applicator.

4. In a machine of the character described, a frame, a channeled applicator member supported on said frame and having a lip forming a coating face on one side of said channel, a platen member supported on the frame in cooperating relation with the applicator member, means for moving one of said members to and from the other to maintain a predetermined space therebetween, means for independently moving said lip to and from said platen member to vary the effect of said space, and means for delivering a coating material to said channel for movement under said coating face of the lip.

5. An apparatus for applying a coating material to the surface of an article including means for supporting and advancing the article in a fixed path, an applicator having entry and departure sides with respect to travel of the article and provided with a coating face terminating at the departure side in a sharply defined edge, means retaining said applicator with said coating face spaced from the surface to be coated to form a material receiving space therebetween and with said edge spaced above said surface corresponding to the thickness of the coating to be applied, said applicator being shaped between the entry and departure sides so that the entry side is below the departure side to substantially contact said surface, and pressure means for feeding a coating material into said space for forced departure under said edge supplemented by draft of the advancing article.

6. In an apparatus for coating sheets including a platen for supporting a sheet to be coated, an applicator having a coating face, means supporting the applicator with said coating face spaced from the surface of the sheet supported by the platen, means for feeding coating material to said space, said applicator being of a shape to sufficiently close the entry side of said space to retard back flow of said material, means for effecting movement of said sheet relatively to said face whereby the coating material is drawn into said space and pressed against said sheet incidental to advancement of the sheet, and means supplying pressure to said coating material to supplement the drawing action of said sheet.

7. In a coating apparatus, a coating member having an enclosed channel and having an entry face on one side of the channel to guide an object to be coated thereunder and having a coating face on the opposite side of said channel, a platen for supporting the object under said coating face in spaced relation therewith to provide a film forming space, said entry face having a shape to substantially close the entry side of said space, means for circulating a coating material through said channel to keep said space filled with coating material, and means for effecting advancement of the object simultaneously with forming a film in said space.

8. In a coating machine, coating and platen members, means supportingly spacing said members to pass an article to be coated therebetween while supported on the platen member and to leave a predetermined film space between the coating member and the surface to be coated, said coating member having the entry side shaped to substantially close the entry side of said space, and means for feeding a coating material into said film space to form a coating film on the surface of said article.

9. In a machine of the character described, a coating applicator comprising a bar having a port through which coating material is exuded and provided with a work contacting face on one side of the port to stop flow of said exuded material in that direction and provided with an offset coating face on the other side of said port to press the exuded material against the work piece.

10. A coating apparatus including a platen for supporting a work piece having a surface to be coated, coating means spaced from the platen to pass the work piece therebetween and having an entry face substantially contacting said surface to form a coating stop and having a smoothing face spaced from the surface to be coated to form a film mold, means for effecting advance of said work piece, and pressure means for introducing a coating material intermediate said offset faces and against said surface for diversion by said stop and extrusion into the film space synchronously with advancement of said work piece to form a continuous film coating.

11. In a coating machine, coating and platen members, means supportingly spacing said members to pass separate sheets to be coated therebetween while supported on the platen member and to leave a predetermined film thickness between the coating member and the surface to be coated, means for feeding a coating material into said film space to form a coating film on the surface of said sheet, and sheet contacting means having connection with said feeding means to shut off said feed in timed relation with said sheets.

12. In a machine for coating sheets, a platen roller for movably supporting a sheet to be coated, a coating applicator having a coating face substantially corresponding in curvature to and spaced from the platen roller and having a port through which a coating material is exuded, a valve controlling said port, and a closed conducting circuit for supplying a coating material through said applicator including means for supplying said coating material through said port and under the coating face with sufficient pressure to fill said space and hold the sheet against said platen roller while the sheet is being carried under said coating face.

13. A coating machine including a channeled applicator member, a platen member for supporting a work piece movable under said applicator member, means for delivering a liquid coating material to said channel of the applicator member under pressure greater than the static head of said material, means supporting said members to prevent movement of said members apart under the pressure of said material, and means for progressively advancing the work piece between said members, said applicator member having an entry edge on the entry side of said channeled portion substantially in contact with the surface of the work piece to retard back-flow of material under said pressure and having a coating face spaced from and cooperating with the surface of said work piece to be coated to provide a film forming mold into which the material is exuded by said pressure, said coating face terminating in a sharply defined departure edge spaced from the surface of the work piece corresponding to the thickness of the applied coating.

14. A coating machine including a channeled applicator member, a platen member for supporting a work piece movable under said applicator member, means for delivering a liquid coating material to said channel of the applicator member under pressure greater than the static head of said material, means supporting said members to prevent movement of said members apart under the pressure of said material, means for progressively advancing the work piece between said members, said applicator member having an entry edge on the entry side of said channeled portion substantially in contact with the surface of the work piece to retard back-flow of material under said pressure and having a coating face spaced from and cooperating with the surface of said work piece to be coated to provide a film forming mold into which the material is exuded by said pressure, said coating face terminating in a sharply defined departure edge spaced from the surface of the work piece corresponding to the thickness of the coating, and a valve controlling outlet of the material from the channel of said applicator member to said film forming mold.

15. A coating machine including a channeled applicator member, a platen member for supporting a work piece movable under said applicator member, means for delivering a liquid coating material to said channel of the applicator member under pressure greater than the static head of said material, means supporting said members to prevent movement of said members apart under the pressure of said material, means for progressively advancing the work piece between said members, said applicator member having an entry edge on the entry side of said channeled portion substantially in contact with the surface of the work piece to retard back-flow of material under said pressure and having a coating face spaced from and cooperating with the surface of said work piece to be coated to provide a film forming mold into which the material is exuded by said pressure, said coating face terminating in a sharply defined departure edge spaced from the surface of the work piece corresponding to the thickness of the coating, a valve controlling outlet of the material from the channel of said applicator member to said film forming mold, and means having contact with the work piece for controlling said valve.

ALFRED J. DIESCHER.